US012028836B2

(12) United States Patent
Zhao et al.

(10) Patent No.: US 12,028,836 B2
(45) Date of Patent: Jul. 2, 2024

(54) RETRANSMISSION RESOURCE CONFIGURATION METHOD AND DEVICE, CHIP AND COMPUTER PROGRAMS

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/475,302

(22) Filed: Sep. 14, 2021

(65) Prior Publication Data

US 2022/0007338 A1 Jan. 6, 2022

Related U.S. Application Data

(63) Continuation of application No. PCT/CN2019/080260, filed on Mar. 28, 2019.

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1816* (2013.01); *H04L 1/1896* (2013.01); *H04W 72/0446* (2013.01); *H04W 72/1263* (2013.01)

(58) Field of Classification Search
CPC ........... H04W 72/02; H04W 72/00446; H04W 72/1263; H04L 1/1816; H04L 1/1896
See application file for complete search history.

(56) References Cited

U.S. PATENT DOCUMENTS

2011/0249630 A1 10/2011 Kim et al.
2020/0029318 A1* 1/2020 Guo ..................... H04L 1/1822
(Continued)

FOREIGN PATENT DOCUMENTS

CN 108024366 A 5/2018
CN 108574983 A 9/2018
(Continued)

OTHER PUBLICATIONS

3GPP TSG RAN WG1 #96—R1-1902274—Athens, Greece, Feb. 25-Mar. 1, 2019—Samsung, On Physical Layer Procedures for NR V2X (13 pages).
(Continued)

*Primary Examiner* — Rhonda L Murphy
(74) *Attorney, Agent, or Firm* — Perkins Coie LLP (57) ABSTRACT

The present disclosure discloses a retransmission resource configuration method and a device, a chip and computer programs, a network side can configure at least two sidelink transmission resources for a first terminal device to perform the first side data transmission and side data retransmission, alternatively, the network side can configure the first terminal device with a first SR transmission resource and a second SR transmission resource, which are respectively used by the first terminal device to apply to the network side for the sidelink transmission resource used for the first side data transmission and for the sidelink transmission resource used for the side data retransmission.

16 Claims, 5 Drawing Sheets

(51) Int. Cl.
  *H04L 1/1867*    (2023.01)
  *H04W 72/0446*   (2023.01)
  *H04W 72/1263*   (2023.01)

(56) References Cited

U.S. PATENT DOCUMENTS

| | | | | |
|---|---|---|---|---|
| 2020/0068609 A1* | 2/2020 | Wang | .................... | H04W 72/02 |
| 2020/0154404 A1* | 5/2020 | Goktepe | ............... | H04L 1/1664 |
| 2020/0305127 A1* | 9/2020 | Huang | ............. | H04W 72/0453 |
| 2021/0084462 A1* | 3/2021 | Hwang | ................. | H04L 1/1614 |
| 2021/0400681 A1* | 12/2021 | Wang | .................... | H04L 5/0053 |
| 2022/0060286 A1* | 2/2022 | Yoshioka | .............. | H04L 1/1896 |
| 2022/0078753 A1* | 3/2022 | Park | ....................... | H04L 5/0053 |

FOREIGN PATENT DOCUMENTS

| | | |
|---|---|---|
| EP | 3706493 A1 | 9/2020 |
| WO | 2018077425 A1 | 5/2018 |
| WO | 2018084673 A1 | 5/2018 |
| WO | 2018171540 A1 | 9/2018 |

OTHER PUBLICATIONS

3GPP TSG RAN WG1 #96—R1-1902799—Athens, Greece, Feb. 25-Mar. 1, 2019—NTT Docomo, Inc., Sidelink physical layer procedure for NR V2X (8 pages).
3GPP TSG RAN WG1 Meeting #96—R1-1901537—Athens, Greece, Feb. 25-Mar. 1, 2019—Huawei, HiSilicon, Sidelink physical layer procedures for NR V2X (16 pages).
3GPP TSG RAN WG1 Meeting #96—R1-1901931—Athens, Greece, Feb. 25-Mar. 1, 2019—LG Electronics, Discussion on physical layer procedure for NR V2X (12 pages).
3GPP TSG RAN WG1 Meeting #96—R1-1901993—Athens, Greece, Feb. 25-Mar. 1, 2019—CATT, Discussion on physical layer procedures in NR V2X (9 pages).
3GPP TSG RAN WG1 Meeting #96—R1-1902995—Athens, Greece, Feb. 25-Mar. 1, 2019—Qualcomm Incorporated, Physical layer procedures for HARQ operation for groupcast and unicast transmissions (12 pages).
3GPP TSG RAN WG1 RAN1#96—R1-1902482—Athens, Greece, Feb. 25-Mar. 1, 2019—Intel Corporation, Physical Layer Procedures for NR V2X Sidelink Design (14 pages).
3GPP TSG-RAN WG1 Meeting #96—R1-1903164—Athens, Greece Feb. 25-Mar. 1, 2019—Ericsson, Remaining details on PHY procedures for Rel. 16 NR V2X (13 pages).
International Search Report dated Dec. 17, 2019 of PCT/CN2019/080260 (4 pages).
Examination Report for Indian Application No. 202117042555 issued Mar. 29, 2022. 6 pages with English translation.
Extended European Search Report for European Application No. 19921108.7 issued Feb. 17, 2022. 11 pages.
Huawei et al. "Sidelink physical layer procedures for NR V2X" R1-1900023; 3GPP TSG RAN WG1 Ad-Hoc Meeting 1901; Taipei, Taiwan; Jan. 21-25, 2019. 13 pages.
NEC "Resource allocation mechanism for NR V2X" R1-1900671; 3GPP TSG RAN WG1 Ad-Hoc Meeting 1901; Taipei, Taiwan; Jan. 21-25, 2019. 6 pages.
Examination Report for European Application No. 19921108.7 issued Sep. 5, 2022. 7 pages with English translation.
Huawei et al. "Sidelink physical layer structure for NR V2X" R1-1812206; 3GPP TSG RAN WG1 Meeting #95; Spokane, USA; Nov. 12-16, 2018. 12 pages.
Notice of Reasons for Refusal for Japanese Application No. 2021-557425 issued Jul. 22, 2022. 6 pages with English translation.
Samsung "Considerations on Sidelink HARQ Procedure" R1-1901052; 3GPP TSG RAN WG1 Ad-Hoc Meeting 1901; Taipei, Taiwan, Jan. 21-25, 2019. 9 pages.
Samsung "On Physical Layer Procedures for NR V2X" R1-1901048; 3GPP TSG RAN WG1 Ad-Hoc Meeting 1901; Taipei, Taiwan; Jan. 21-25, 2019. 12 pages.
The First Office Action for Chinese Application No. 2021110667083 issued Sep. 9, 2022. 16 pages with English translation.
Second Office Action for Chinese Application No. 202111066708.3 issued Nov. 24, 2022. 12 pages with English translation.
Notice of Preliminary Rejection of the Korean application No. 10-2021-7034578, issued on Aug. 22, 2023. 9 pages with English translation.
Search Report of the European application No. 23182393.1, issued on Oct. 13, 2023. 10 pages.
Hearing Notice for Indian Application No. 202117042555 Issued Jan. 9, 2024, 3 Pages.

* cited by examiner

RETRANSMISSION RESOURCE CONFIGURATION METHOD AND DEVICE, CHIP AND COMPUTER PROGRAMS

CROSS-REFERENCE TO RELATED APPLICATION

This application is a continuation application of International PCT Application No. PCT/CN2019/080260 filed on Mar. 28, 2019, the entire content of which is hereby incorporated by reference.

TECHNICAL FIELD

The present disclosure relates to the wireless network technology, in particular to a method for configuring a retransmission resource, a device, a chip, and a computer program.

BACKGROUND

A vehicle networking system is a Sidelink (SL) transmission technology based on Long Term Evaluation (LTE)-Device to Device (D2D). Different from a mode in which in a traditional LTE system, communication data are received or sent through a base station, a direct Device to Device communication mode is used in the vehicle networking system, thus a higher spectral efficiency and a lower transmission delay are achieved.

Autopilot needs to be supported in a New Radio (NR)-Vehicle to Everything (V2X) system. For this reason, higher requirements are put forward for data interaction between vehicles, such as a better throughput, a lower delay, higher reliability, a larger coverage range, or more flexible resource allocation, etc.

For a terminal device, its sidelink transmission resource may be allocated by a network side (such as a base station), and the terminal device may perform transmission of sidelink data according to the sidelink transmission resource allocated by the network side.

In order to improve reliability of sidelink transmission, a feedback channel for sidelink transmission is introduced into the NR-V2X. After the terminal device sends sidelink data, it may determine whether retransmission of sidelink data needs to be performed according to sidelink feedback information sent by a receiving end. However, there is no effective solution about how to acquire a sidelink transmission resource for retransmission of sidelink data.

SUMMARY

In view of this, implementations of the present disclosure provide a method for configuring a retransmission resource, a device, a chip, and a computer program.

In a first aspect, a method for configuring a retransmission resource is provided, which includes: acquiring, by a first terminal device, at least two sidelink transmission resources configured by a network side; wherein the at least two sidelink transmission resources are used for the first terminal device to perform initial transmission of sidelink data and retransmission of the sidelink data.

In a second aspect, a method for configuring a retransmission resource is provided, which includes: acquiring, by a first terminal device, first scheduling request (SR) transmission resources and second SR transmission resources configured by a network side, wherein there are at least one set of the first SR transmission resources and at least one set of the second SR transmission resources respectively; the first SR transmission resources are used for the first terminal device to apply from the network side for a sidelink transmission resource for initial transmission of sidelink data, and the second SR transmission resources are used for the first terminal device to apply from the network side for a sidelink transmission resource for retransmission of the sidelink data.

In a third aspect, a method for configuring a retransmission resource is provided, which includes: configuring, by a network side, at least two sidelink transmission resources for a first terminal device; wherein the at least two sidelink transmission resources are used for the first terminal device to perform initial transmission of sidelink data and retransmission of the sidelink data.

In a fourth aspect, a method for configuring a retransmission resource is provided, which includes: configuring, by a network side, first scheduling request (SR) transmission resources and second SR transmission resources for a first terminal device, wherein there are at least one set of the first SR transmission resources and at least one set of the second SR transmission resources respectively; the first SR transmission resources are used for the first terminal device to apply from the network side for a sidelink transmission resource for initial transmission of sidelink data, and the second SR transmission resources are used for the first terminal device to apply from the network side for a sidelink transmission resource for retransmission of the sidelink data.

In a fifth aspect, a device for configuring a retransmission resource is provided, which is configured to perform the method in the first aspect described above or various implementations thereof.

Specifically, the device includes function modules configured to perform the method in the first aspect described above or various implementations thereof.

In a sixth aspect, a device for configuring a retransmission resource is provided, which is configured to perform the method in the second aspect described above or various implementations thereof.

Specifically, the device includes function modules configured to perform the method in the second aspect described above or various implementations thereof.

In a seventh aspect, a device for configuring a retransmission resource is provided, which is configured to perform the method in the third aspect described above or various implementations thereof.

Specifically, the device includes function modules configured to perform the method in the third aspect described above or various implementations thereof.

In an eighth aspect, a device for configuring a retransmission resource is provided, which is configured to perform the method in the fourth aspect described above or various implementations thereof.

Specifically, the device includes function modules configured to perform the method in the fourth aspect described above or various implementations thereof.

In a ninth aspect, a communication device is provided, including a processor and a memory, wherein the memory is configured to store a computer program, and the processor is configured to call and run the computer program stored in the memory to perform the method in any one of the above first to fourth aspects or various implementations thereof.

In a tenth aspect, a chip is provided, which is configured to perform the method in any one of the first to fourth aspects or various implementations thereof.

Specifically, the chip includes a processor configured to call and run a computer program from a memory, enabling a device in which the chip is installed to perform the method in any one of the first aspect to the fourth aspect or various implementations thereof.

In an eleventh aspect, a computer readable storage medium is provided which is configured to store a computer program that enables a computer to perform the method in any one of the first to fourth aspects or various implementations thereof.

In a twelfth aspect, a computer program product is provided, which includes computer program instructions that enable a computer to perform the method in any one of the first to fourth aspects or various implementations thereof.

In a thirteenth aspect, a computer program is provided, which, when run on a computer, enables the computer to perform the method in any one of the first to fourth aspects or various implementations thereof.

DETAILED DESCRIPTION

Technical solutions of implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Figure 1:
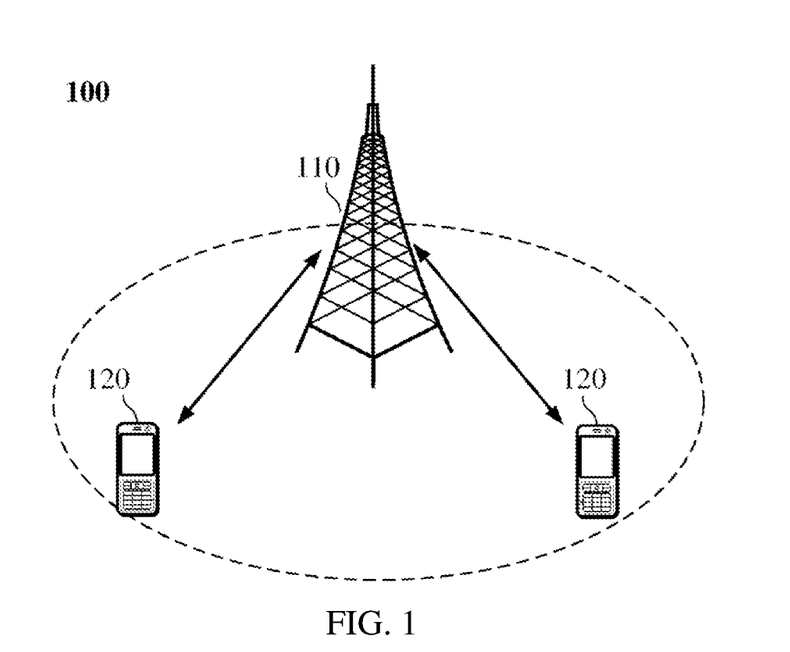
FIG. 1 is a schematic diagram of an architecture of a communication system according to an implementation of the present disclosure.

Illustratively, FIG. 1 is a schematic diagram of architecture of a communication system according to an implementation of the present disclosure. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The wireless communication system 100 further includes at least one terminal 120 located within a coverage range of the network device 110. As used herein, the term "terminal device" includes, but is not limited to, an apparatus configured to receive/send a communication signal via a wired line connection, for example, via Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone, a Personal Communications System (PCS) terminal which may combine a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network may also be referred to as an NR system or an NR network.

The technical solutions of the implementations of the present disclosure are applicable to an unlicensed spectrum or a licensed spectrum, which is not limited in the implementations of the present disclosure.

FIG. 1 exemplarily illustrates one network device and two terminal devices. Optionally, the communication system 100 may include multiple network devices, and other numbers of terminal devices may be included within the coverage range of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as network controllers and mobile management entities and other network entities, which are not limited in the implementations of the present disclosure.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is an "or" relation between the associated objects before and after "/".

In a method for configuring a retransmission resource proposed by an implementation of the present disclosure, a first terminal device may acquire at least two sidelink transmission resources configured (allocated) by a network side, wherein the at least two sidelink transmission resources are used for the first terminal device to perform initial transmission of sidelink data and retransmission of sidelink data.

When the first terminal device applies for a sidelink transmission resource from the network side, the network side may allocate at least two sidelink transmission resources to the first terminal device, wherein a specific quantity thereof may be determined according to an actual need.

Optionally, the network side may allocate a fixed quantity of sidelink transmission resources to the first terminal device, wherein the fixed quantity may be predetermined by a protocol or configured by the network side.

Optionally, the network side may also determine a quantity of the allocated sidelink transmission resources according to a first attribute of sidelink data to be transmitted by the first terminal device, wherein the first attribute may include at least one of following: reliability, a delay, a communication distance, or a priority. Further, when applying for a transmission resource from the network side, the first terminal device will send to the network side the first attribute information of the sidelink data to be transmitted. Optionally, the first terminal device may carry the first attribute information through a mode such as Buffer Status Report (BSR), UE Assistance Information, or Radio Resource Control (RRC) signaling, etc.

The first terminal device may use a first sidelink transmission resource among the at least two sidelink transmission resources to perform the initial transmission of sidelink data. When determining that retransmission of sidelink data is needed according to sidelink feedback information received from a second terminal device, the first terminal device may perform the retransmission of sidelink data through an available one of the at least two sidelink transmission resources.

NR-V2X needs to support various transmission modes, such as unicast, groupcast, or broadcast. In order to improve the reliability of sidelink transmission, a feedback channel for sidelink transmission is introduced into NR-V2X.

A terminal device at a receiving end feeds back sidelink feedback information of Hybrid Automatic Repeat Request (HARQ) ACK or NACK to a terminal device at a sending end according to detected Physical Sidelink Control Channel (PSCCH) and Physical Sidelink Shared Channel (PSSCH), and the terminal device at the sending end determines whether it is required to retransmit data to the terminal device at the receiving end according to the received sidelink feedback information. If NACK is received, it is determined that the data needs to be retransmitted. If ACK is received, it is determined that the data does not need to be retransmitted.

Figure 2:
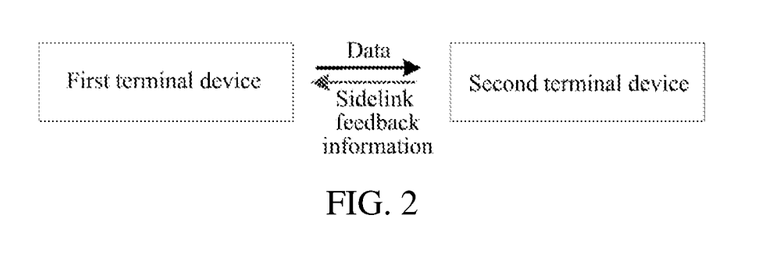
FIG. 2 is a schematic diagram of an interaction mode of a first terminal device and a second terminal device according to an implementation of the present disclosure.

FIG. 2 is a schematic diagram of an interaction mode of a first terminal device and a second terminal device according to an implementation of the present disclosure. As shown in FIG. 2, the first terminal device herein is a terminal device at a sending end, the second terminal device is a terminal device at a receiving end, the first terminal device sends sidelink data to the second terminal device, the second terminal device sends sidelink feedback information (HARQ ACK or NACK) according to whether the data is received correctly or not, and the first terminal device determines whether data retransmission is needed or not according to the received sidelink feedback information.

There is a time domain interval (a parameter k) between a time domain resource of a Physical Sidelink Feedback Channel (PSFCH) for sending the HARQ ACK or NACK and a time domain resource of its corresponding PSSCH. For example, the PSSCH is sent in a time slot N, then a time slot in which the PSFCH is located may be a time slot N+k, wherein the parameter k may be predetermined by a protocol, configured by the network side, determined by the first terminal device according to configuration information of the network side, or determined by the second terminal device according to configuration information of the network side.

The first terminal device may use a first sidelink transmission resource among the at least two sidelink transmission resources configured by the network side for the first terminal device to perform the initial transmission of sidelink data. In addition, if the sidelink feedback information of the second terminal device received by the first terminal device is NACK, it may be determined that retransmission of sidelink data is needed, and accordingly, the retransmission of sidelink data may be performed through the available one among the at least two sidelink transmission resources, including but not limited to following two implementations.

1) First Mode

In this mode, the first terminal device may retransmit the sidelink data through the first available sidelink transmission resource located after a time T among the at least two sidelink transmission resources, wherein the time T is a time when the first terminal device receives the sidelink feedback information.

Figure 3:
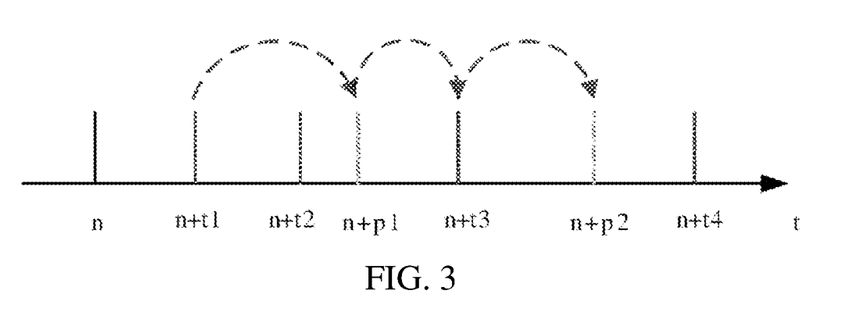
FIG. 3 is a first schematic diagram of a sidelink data transmission mode according to an implementation of the present disclosure.

With reference to the above introduction, FIG. 3 is a first schematic diagram of a sidelink data transmission mode according to an implementation of the present disclosure. As shown in FIG. 3, the first terminal device applies for a sidelink transmission resource at time n from the network side. The network side allocates four sidelink transmission resources to the first terminal device, wherein the four sidelink transmission resources are located at times n+t1, n+t2, n+t3, and n+t4 respectively. The first terminal device uses the first sidelink transmission resource n+t1 to perform initial transmission of the sidelink data, and receives the sidelink feedback information sent by the second terminal device at a time n+p1, wherein the sidelink feedback information is NACK. Then the first terminal device determines that the retransmission of sidelink data is needed, and selects a first available sidelink transmission resource after the time n+p1. At this time, the sidelink transmission resource at the time n+t2 is no longer available, and a sidelink transmission resource at the time n+t3 is the first available sidelink transmission resource after the time n+p1. Therefore, the first terminal device uses the sidelink transmission resource at the time n+t3 to perform the retransmission of sidelink data, and receives the sidelink feedback information sent by the second terminal device at a time n+p2. If the sidelink feedback information is still NACK, the first terminal device selects the first available sidelink transmission resource after the time n+p2, i.e. a sidelink transmission resource at the time n+t4, to perform the retransmission of sidelink data. If sidelink feedback information received by the second terminal device subsequently is ACK, it means that data is received correctly, with no need to be retransmitted again.

In the above mode, the network side allocates multiple sidelink transmission resources to the first terminal device at one time, so that when the first terminal device needs to perform the retransmission of sidelink data, it does not need to re-apply for a sidelink transmission resource from the network side, and may directly select a sidelink transmission resource from the multiple allocated sidelink transmission resources and perform the retransmission of sidelink data, thus simplifying processing flow of the first terminal device and improving data transmission efficiency, etc.

2) Second Mode

In the first mode, there is no limit to a time domain interval between any two adjacent sidelink transmission resources among the at least two sidelink transmission resources configured by the network side.

While in the present mode, it is required that the time domain interval between any two adjacent sidelink transmission resources is larger than a parameter k, wherein the parameter k is a time domain interval between a PSSCH sent by the first terminal device and a PSFCH corresponding to the PSSCH. The parameter k may be predetermined by a protocol, configured by the network side, determined by the first terminal device according to configuration information of the network side, or determined by the second terminal device according to configuration information of the network side. Since the network side may know the parameter, when the at least two sidelink transmission resources are allocated to the first terminal device, the resource allocation may be performed according to the parameter.

In addition, no matter whether in the first mode or the second mode, assuming that the sidelink transmission resources 1, 2, and 3 are sequentially adjacent sidelink transmission resources, the time domain interval between the sidelink transmission resource 1, and the sidelink transmission resource 2 may be same as or different from the time domain interval between the sidelink transmission resource 2, and the sidelink transmission resource 3.

In this mode, the first terminal device may perform the retransmission of sidelink data through the first unused sidelink transmission resource among the at least two sidelink transmission resources.

Figure 4:
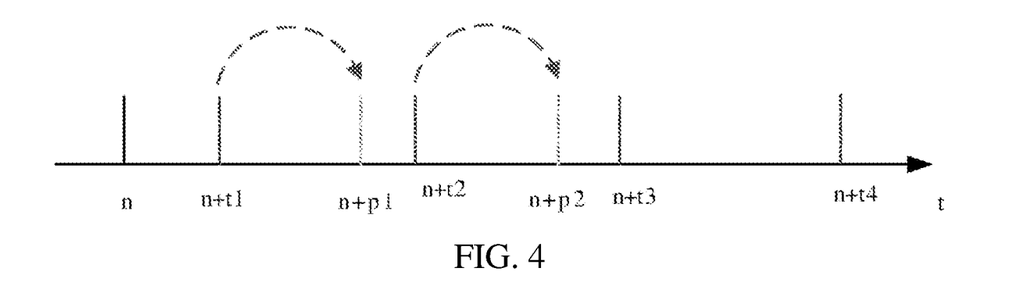
FIG. 4 is a second schematic diagram of a sidelink data transmission mode according to an implementation of the present disclosure.

With reference to the above introduction, FIG. 4 is a second schematic diagram of a sidelink data transmission mode according to an implementation of the present disclosure. As shown in FIG. 4, the first terminal device applies for a sidelink transmission resource at a time n from the network side. The network side allocates four sidelink transmission resources to the first terminal device, wherein the four sidelink transmission resources are located at times n+t1, n+t2, n+t3, and n+t4 respectively, wherein a time domain interval between any two adjacent sidelink transmission resources is larger than a time domain interval between a PSSCH sent by the first terminal device and a PSFCH corresponding to the PSSCH, that is, a parameter k. The first terminal device uses a first sidelink transmission resource n+t1 to perform initial transmission of sidelink data, and receives sidelink feedback information sent by the second terminal device at a time n+p1, wherein the sidelink feedback information is NACK. Then the first terminal device determines that retransmission of sidelink data is needed, selects a sidelink transmission resource at the time n+t2 to perform the retransmission of sidelink data, and receives sidelink feedback information again at a time n+p2. If the sidelink feedback information is still NACK, a sidelink transmission resource at the time n+t3 is selected to perform retransmission of sidelink data. If sidelink feedback information of the second terminal device received subsequently is ACK, it means that the data is received correctly, with no need to be retransmitted again.

In the above mode, the network side allocates multiple sidelink transmission resources to the first terminal device according to the time domain interval between the PSSCH and the PSFCH, so that each sidelink transmission resource may be used by the first terminal device for performing transmission (initial transmission or retransmission) of sidelink data, which thus may ensure that the resources allocated by the network side may all be effectively used by the first terminal device, further improving reliability and resource utilization rate of the transmission sidelink data.

It should be noted that the first terminal device uses the at least two sidelink transmission resources configured by the network side for performing the transmission sidelink data. If there is an unused sidelink transmission resource when receiving ACK sidelink feedback information sent by the second terminal device, the first terminal device may use a following processing mode.

The first terminal device sends indication information to the network side, and the network side acquires the sidelink transmission resource unused by the first terminal device according to the indication information sent by the first terminal device, and may reallocate the sidelink transmission resource.

Or, the first terminal device uses the unused sidelink transmission resource to transmit new sidelink data, that is, if the first terminal device has new sidelink data to be sent, it uses the sidelink transmission resource to transmit the new sidelink data.

The first terminal device sends indication information to release an unused transmission resource, and another terminal device may use the sidelink transmission resource by detecting the indication information from the first terminal device. For example, in each transmission process, the first terminal device indicates, in the PSCCH, information of a sidelink transmission resource that is reserved for next transmission. When receiving the ACK sidelink feedback information, the first terminal device sends indication information to release an unused sidelink transmission resource. Another terminal device knows that the first terminal device has released the sidelink transmission resource by detecting the indication information from the first terminal device, and may select a sidelink transmission resource by sensing.

In another method for configuring a retransmission resource proposed by an implementation of the present disclosure, the first terminal device may obtain first SchedulingRequest (SR) transmission resources and second SR transmission resources configured by the network side, wherein there are at least one set of the first SR transmissions and at least one set of the second SR transmission resources respectively. Herein, the first SR transmission resources are used for the first terminal device to apply from the network side for a sidelink transmission resource for initial transmission of sidelink data, and the second SR transmission resource is used for the first terminal device to apply from the network side for a sidelink transmission resource for retransmission of sidelink data. Specific quantities of the first SR transmission resources and specific quantities of the second SR transmission resources may be determined according to an actual need, for example, they may each be one set.

The network side may distinguish whether a sidelink transmission resource applied by the first terminal device is used for initial transmission of sidelink data or retransmission of sidelink data through a first SR transmission resource and a second SR transmission resource configured for the first terminal device.

Specifically, if it is determined that initial transmission of sidelink data is required, the first terminal device may use the first SR transmission resource to send first SR information to the network side, wherein the first SR information is used for requesting the network side to allocate to the first terminal device a sidelink transmission resource for the initial transmission of sidelink data. If it is determined that the retransmission of sidelink data is needed, the first terminal device may use the second SR transmission resource to send second SR information to the network side, wherein the second SR information may be used for requesting the network side to allocate to the first terminal device a sidelink transmission resource for the retransmission of sidelink data.

After the network side obtains the first SR information sent by the first terminal device through the first SR transmission resource, that is, after detecting the first SR information on the first SR transmission resource, the network side may allocate to the first terminal device a sidelink transmission resource for the initial transmission of sidelink data. The first terminal device may also send Buffer Status Report (BSR) information to the network side, so that the network side knows a volume of data that the first terminal device needs to transmit, etc., so as to accurately allocate to the first terminal device the sidelink transmission resource for initial transmission of sidelink data in combination with the BSR information.

The network side obtains the second SR information sent by the first terminal device through the second SR transmission resource, that is, after detecting the second SR information on the second SR transmission resource, the network side may allocate to the first terminal device the sidelink transmission resource for the retransmission of sidelink data.

The first terminal device may also send HARQ process indication information to the network side, wherein the HARQ process indication information is used for indicating an HARQ process that needs allocation of a sidelink transmission resource. After the network side obtains the HARQ process indication information sent by the first terminal device, it may allocate a sidelink transmission resource for the HARQ process indicated by the HARQ process indication information.

For example, the first terminal device has sidelink data transmission of multiple HARQ processes. When sidelink data of a certain HARQ process needs to be retransmitted, the first terminal device uses the second SR transmission resource to send the second SR information to the network side, and further, it may also send HARQ process indication information, such as a process identifier, to the network side, wherein the HARQ process indication information may be carried in the second SR information or sent to the network side through another uplink channel. When the network side detects the second SR information on the second SR transmission resource, it determines that the first terminal device requests a retransmission resource, and allocates a sidelink transmission resource for the retransmission of sidelink data for the corresponding HARQ process according to the HARQ process indication information.

Optionally, the network side may also configure multiple sets of first SR transmission resources and second SR transmission resources according to a quantity of sidelink processes, for example, the first SR transmission resources and the second SR transmission resources may be configured respectively for different HARQ processes. In this way, when the first terminal device applies for a sidelink transmission resource from the network side, the first terminal device may directly use a corresponding SR transmission resource without sending HARQ process indication information, and the network side may distinguish which HARQ process it is according to the SR transmission resource used by the first terminal device.

Figure 5:
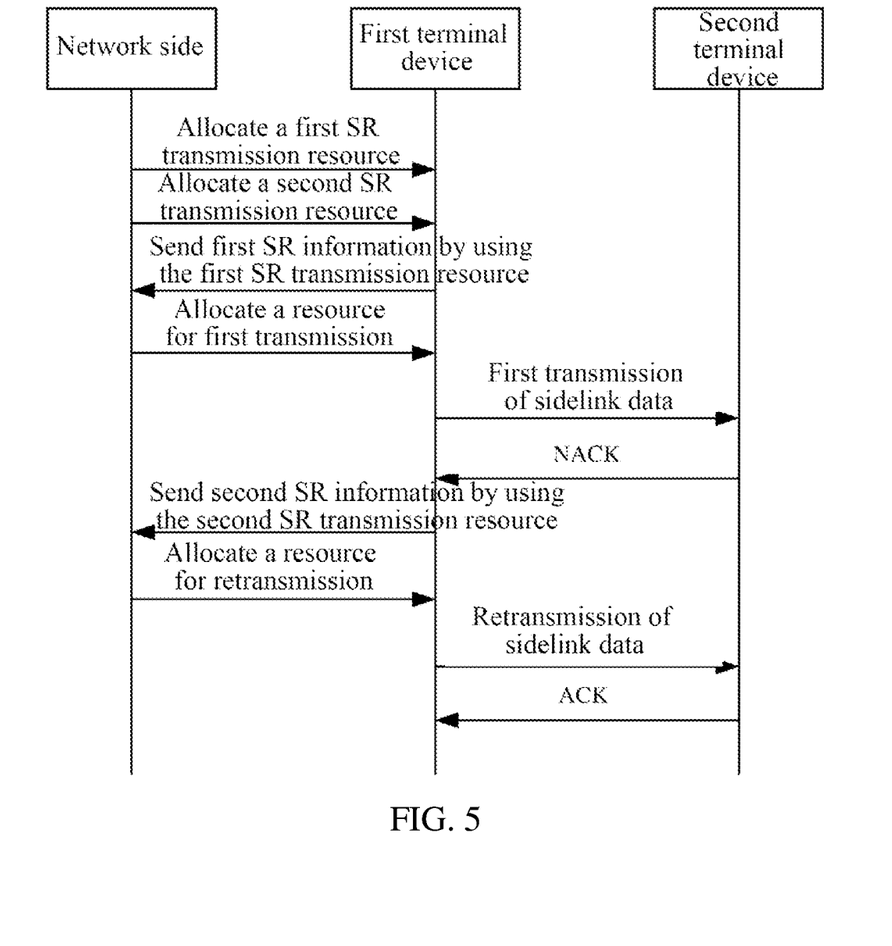
FIG. 5 is a third schematic diagram of a sidelink data transmission mode according to an implementation of the present disclosure.

With reference to the above introduction, FIG. 5 is a third schematic diagram of a sidelink data transmission mode according to an implementation of the present disclosure. As shown in FIG. 5, the network side allocates a first SR transmission resource and a second SR transmission resource to the first terminal device. When initial transmission of sidelink data is needed, the first terminal device sends first SR information to the network side by using the first SR transmission resource, and the network side allocates to the first terminal device a sidelink transmission resource for the initial transmission of sidelink data, and the first terminal device transmits the sidelink data by using the allocated sidelink transmission resource. The first terminal device sends second SR information to the network side by using the second SR transmission resource if sidelink feedback information, which is NACK, sent by the second terminal device is received. The network side allocates to the first terminal device a sidelink transmission resource for retransmission of sidelink data, and the first terminal device retransmits the sidelink data by using the allocated sidelink transmission resource. This transmission ends if sidelink feedback information, which is ACK, sent by the second terminal device is received. The second SR information may be sent to the network side again by using the second SR transmission resource, if sidelink feedback information, which is NACK, sent by the second terminal device is received, and the network side allocates to the first terminal device a sidelink transmission resource for the retransmission of sidelink data again.

In the above mode, the network side determines to allocate to the first terminal device a sidelink transmission resource for the initial transmission of sidelink data or for the retransmission of sidelink data according to different SR transmission resources, so that the first terminal device may apply for a retransmission resource from the network side only when retransmission is needed, which avoids resource waste caused by allocating a retransmission resource to the first terminal device in advance.

In addition, when the first terminal device applies from the network side for the sidelink transmission resource for the initial transmission of sidelink data, the network side may also allocate at least two sidelink transmission resources to the first terminal device, wherein the at least two sidelink transmission resources are used for the first terminal device to perform the initial transmission of sidelink data and the retransmission of sidelink data.

For example, when it is determined that the initial transmission of sidelink data is needed, the first terminal device may send first SR information to the network side by using the first SR transmission resource, the network side may allocate at least two sidelink transmission resources to the first terminal device, and the first terminal device may perform the initial transmission of sidelink data by using a first sidelink transmission resource among the at least two sidelink transmission resources. When it is determined that retransmission of sidelink data is needed, one available sidelink transmission resource may be selected from the at least two sidelink transmission resources for performing the retransmission of sidelink data, a specific implementation may be shown as in the first mode and the second mode.

In the above mode, a quantity of times that the first terminal device applies for resources from the network side may be reduced, thereby simplifying processing flow, and improving data transmission efficiency, etc.

When the first terminal device applies from the network side for a sidelink transmission resource for retransmission of sidelink data, the network side may also allocate at least two sidelink transmission resources to the first terminal device, wherein the at least two sidelink transmission resources are used for the first terminal device to perform the retransmission of sidelink data.

For example, when it is determined that initial transmission of sidelink data is needed, the first terminal device may send first SR information to the network side by using the first SR transmission resource, the network side allocates a sidelink transmission resource for the initial transmission of sidelink data to the first terminal device, and the first terminal device may perform the initial transmission of sidelink data by using the sidelink transmission resource. When it is determined that retransmission of sidelink data is needed, the first terminal device may send second SR information to the network side by using a second SR transmission resource, and the network side may allocate to the first terminal device a sidelink transmission resource for the retransmission of sidelink data, wherein the sidelink transmission resource is at least two sidelink transmission resources. The first terminal device may select one available sidelink transmission resource from the at least two sidelink transmission resources for performing the retransmission of sidelink data, a specific implementation of which may be shown as in the first mode and the second mode.

In the above mode, a quantity of times that the first terminal device applies for resources from the network side may be reduced, thereby simplifying processing flow and improving data transmission efficiency, etc.

In the above-described implementations, the description of each implementation has its own emphasis, and for a part which is not described in detail in a certain implementation, related descriptions in other implementations may be referred to.

The above is the description of method implementations, and the solution of the present disclosure will be further described below through apparatus implementations.

Figure 6:
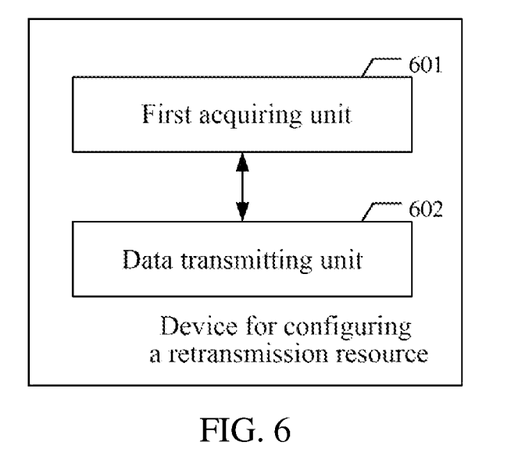
FIG. 6 is a first schematic structural diagram of a device for configuring a retransmission resource according to an implementation of the present disclosure.

FIG. 6 is a first schematic structural diagram of a device for configuring a retransmission resource according to an implementation of the present disclosure. The device for configuring the retransmission resource is applied to a terminal device (such as a first terminal device), and as shown in FIG. 6, the device includes a first acquiring unit 601 configured to acquire at least two sidelink transmission resources configured by a network side, wherein the at least two sidelink transmission resources are used for the device for configuring the retransmission resource to perform initial transmission of sidelink data and retransmission of sidelink data.

The device for configuring the retransmission resource shown in FIG. 6 may further include a data transmitting unit 602 configured to perform initial transmission of sidelink data by using a first sidelink transmission resource among the at least two sidelink transmission resources.

The data transmitting unit 602 may also receive sidelink feedback information from a second terminal device. If it is determined that retransmission of sidelink data is needed according to the received sidelink feedback information, the retransmission of sidelink data may be performed through available one of the at least two sidelink transmission resources.

Herein, the available one among the at least two sidelink transmission resources may include: a first available sidelink transmission resource located after a time T among the at least two sidelink transmission resources, wherein the time T is a time when the device for configuring the retransmission resource receives the sidelink feedback information.

Or, among the at least two sidelink transmission resources, a time domain interval between any two adjacent sidelink transmission resources is larger than a parameter k, wherein the parameter k is a time domain interval between a PSSCH sent by the device for configuring the retransmission resource and a PSFCH corresponding to the PSSCH. Accordingly, the available one among the at least two sidelink transmission resources may include: a first unused sidelink transmission resource among the at least two sidelink transmission resources. Herein, the parameter k may be predetermined by a protocol, configured by the network side, or determined by a terminal device according to configuration information of the network side.

The data transmitting unit 602 transmits sidelink data by using the at least two sidelink transmission resources configured by the network side. If there is an unused sidelink transmission resource when ACK sidelink feedback information is received, a following processing mode may be used: indication information is sent to the network side, and the network side acquires the unused sidelink transmission resource according to the indication information, and may reallocate the sidelink transmission resource; or, new sidelink data is transmitted by using the unused sidelink transmission resource, or indication information is sent, the unused sidelink transmission resource is released, and another terminal device may use the sidelink transmission resource by detecting the indication information of the first terminal device.

Figure 7:
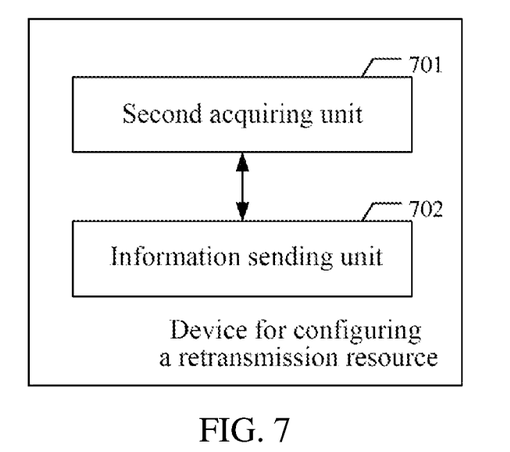
FIG. 7 is a second schematic structural diagram of a device for configuring a retransmission resource according to an implementation of the present disclosure.

FIG. 7 is a second schematic structural diagram of a device for configuring a retransmission resource according to an implementation of the present disclosure. The device for configuring the retransmission resource is applied to a terminal device (such as a first terminal device), and as shown in FIG. 7, the device includes a second acquiring unit 701 configured to acquire a first SR transmission resource and a second SR transmission resource which are configured by a network side. There are at least one set of the first SR transmissions and at least one set of the second SR transmission resources respectively, wherein the first SR transmission resources are used for the device for configuring the retransmission resource to apply from the network side for a sidelink transmission resource for initial transmission of sidelink data, and the second SR transmission resource is used for the device for configuring the retransmission resource to apply from the network side for a sidelink transmission resource for retransmission of sidelink data.

The device for configuring the retransmission resource shown in FIG. 7 may further include an information sending unit 702 configured to send first SR information to the network side by using the first SR transmission resource when it is determined that initial transmission of sidelink data is needed, with the first SR information being used for requesting the network side to allocate to the device for configuring the retransmission resource a sidelink transmission resource for the initial transmission of sidelink data, and send second SR information to the network side by using the second SR transmission resource when it is determined that retransmission of sidelink data is needed, with the second SR information being used for requesting the network side to allocate to the device for configuring the retransmission resource a sidelink transmission resource for the retransmission of sidelink data.

The information sending unit 702 may also send HARQ process indication information to the network side, wherein the HARQ process indication information is used for indicating an HARQ process that needs allocation of a sidelink transmission resource.

When applying from the network side for a sidelink transmission resource for initial transmission of sidelink data, the second acquiring unit 701 may also acquire at least two sidelink transmission resources allocated by the network side, wherein the at least two sidelink transmission resources are used for the device for configuring the retransmission resource to perform the initial transmission of sidelink data and the retransmission of sidelink data.

When applying from the network side for a sidelink transmission resource for the retransmission of sidelink data, the second obtaining unit 701 may also acquire at least two sidelink transmission resources allocated by the network side, wherein the at least two sidelink transmission resources are used for the device for configuring the retransmission resource to perform the retransmission of sidelink data.

Figure 8:
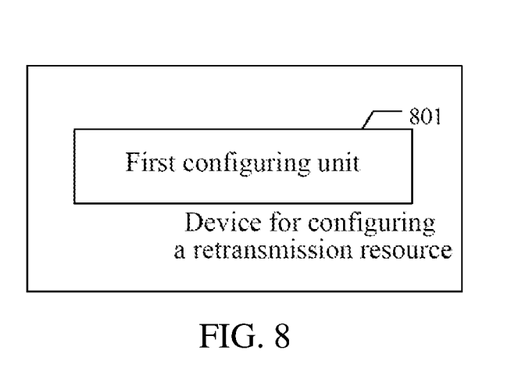
FIG. 8 is a third schematic structural diagram of a device for configuring a retransmission resource according to an implementation of the present disclosure.

FIG. 8 is a third schematic structural diagram of a device for configuring a retransmission resource according to an implementation of the present disclosure. The device for configuring the retransmission resource is applied to a network side, and as shown in FIG. 8, the device includes a first configuring unit 801 configured to configure at least two sidelink transmission resources for a first terminal device, wherein the at least two sidelink transmission resources are used for the first terminal device to perform initial transmission of sidelink data and retransmission of sidelink data.

Optionally, among the at least two sidelink transmission resources, a time domain interval between any two adjacent sidelink transmission resources is larger than a parameter k, wherein the parameter k is a time domain interval between a PSSCH sent by the first terminal device and a PSFCH corresponding to the PSSCH.

Optionally, the first configuring unit 801 may configure a fixed quantity of sidelink transmission resources for the first terminal device, wherein the fixed quantity may be predetermined by a protocol or configured by the network side.

Optionally, the first configuring unit 801 may also determine a quantity of the configured sidelink transmission resources according to a first attribute of sidelink data to be transmitted by the first terminal device, wherein the first attribute may include at least one of following: reliability, a delay, a communication distance, or a priority. Further, when applying for a transmission resource from the network side, the first terminal device will send to the network side the first attribute information of the sidelink data to be transmitted. Optionally, the first terminal device may carry the first attribute information through BSR, terminal auxiliary information, or RRC signaling, etc.

Figure 9:
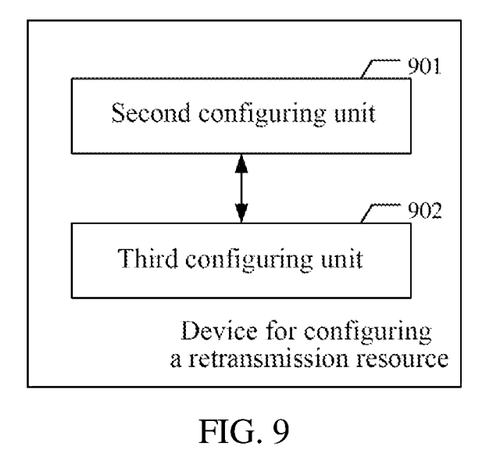
FIG. 9 is a fourth schematic structural diagram of a device for configuring a retransmission resource according to an implementation of the present disclosure.

FIG. 9 is a fourth schematic structural diagram of a device for configuring a retransmission resource according to an implementation of the present disclosure. The device for configuring the retransmission resource is applied to the network side, and as shown in FIG. 9, the device includes a second configuring unit 901 configured to configure first SR transmission resources and second SR transmission resources for a first terminal device, wherein there are at least one set of the first SR transmissions and at least one set of the second SR transmission resources respectively. The first SR transmission resources are used for the first terminal device to apply from the network side for a sidelink transmission resource for initial transmission of sidelink data, and the second SR transmission resource is used for the first terminal device to apply from the network side for a sidelink transmission resource for retransmission of sidelink data.

The device for configuring the retransmission resource shown in FIG. 9 may further include a third configuring unit 902 configured to acquire first SR information sent by the first terminal device through the first SR transmission resources, allocate to the first terminal device a sidelink transmission resource for the initial transmission of sidelink data, acquire second SR information sent by the first terminal device through the second SR transmission resources, and allocate to the first terminal device a sidelink transmission resource for retransmission of sidelink data.

The third configuring unit 902 may also acquire HARQ process indication information sent by the first terminal device, and allocate a sidelink transmission resource for an HARQ process indicated by the HARQ process indication information.

Optionally, the second configuring unit 901 may also configure multiple sets of first SR transmission resources and second SR transmission resources according to a quantity of sidelink processes, for example, the first SR transmission resources and the second SR transmission resources may be configured respectively for different HARQ processes. In this way, when the first terminal device applies for a sidelink transmission resource from the network side, the first terminal device may directly use a corresponding SR transmission resource without sending HARQ process indication information, and the third configuring unit 902 may distinguish which HARQ process it is according to the SR transmission resource used by the first terminal device.

In addition, when it is determined that the first terminal device applies for a sidelink transmission resource for the initial transmission of sidelink data, the third configuring unit 902 may also allocate at least two sidelink transmission resources to the first terminal device, wherein the at least two sidelink transmission resources are used for the first terminal device to perform the initial transmission of sidelink data and the retransmission of sidelink data.

When it is determined that the first terminal device applies for a sidelink transmission resource for the retransmission of sidelink data, the third configuring unit 902 may also allocate at least two sidelink transmission resources to the first terminal device, wherein the at least two sidelink transmission resources are used for the first terminal device to perform the retransmission of sidelink data.

For a specific working flow of the device implementations shown in FIG. 6, FIG. 7, FIG. 8, and FIG. 9, please refer to relevant description in the aforementioned method implementations, which will not be repeated.

Figure 10:
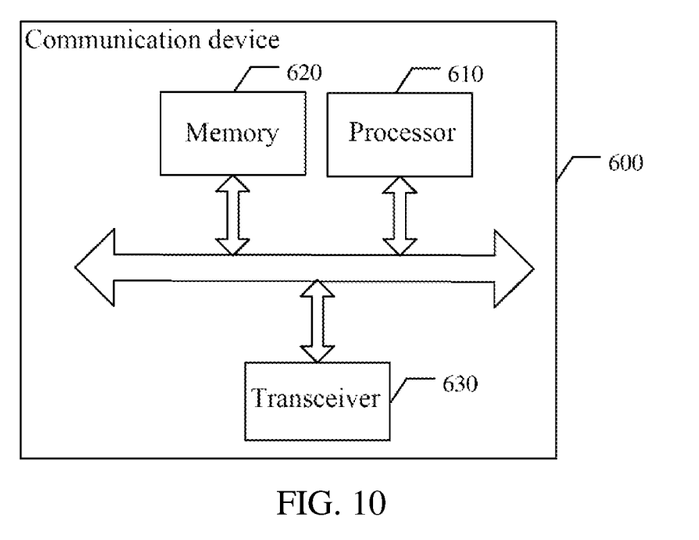
FIG. 10 is a schematic structural diagram of a communication device 600 according to an implementation of the present disclosure.

FIG. 10 is a schematic structural diagram of a communication device 600 according to an implementation of the present disclosure. The communication device 600 shown in FIG. 10 includes a processor 610. The processor 610 may call a computer program from a memory 620 and run the computer program, to implement the methods in the implementations of the present disclosure.

Optionally, as shown in FIG. 10, the communication device 600 may further include the memory 620. The processor 610 may call and run the computer program from the memory 620 to implement the methods in the implementations of the present disclosure.

The memory 620 may be a separate component independent of the processor 610 or may be integrated in the processor 610.

Optionally, as shown in FIG. 10, the communication device 600 may further include a transceiver 630, and the processor 610 may control the transceiver 630 to communicate with another device. Specifically, the transceiver 730 may send information or data to another device or receive information or data sent by another device.

The transceiver 630 may include a transmitter and a receiver. The transceiver 630 may further include antennas, the number of the antennas may be one or more.

Optionally, the communication device 600 may be specifically the network device in accordance with an implementation of the present disclosure, and the communication device 600 may implement the corresponding processes implemented by the network device in various methods in the implementations of the present disclosure, which will not be described repeatedly herein for brevity.

Optionally, the communication device 600 may be specifically the mobile terminal/terminal device in accordance with an implementation of the present disclosure, and the communication device 600 may implement the corresponding processes implemented by the mobile terminal/terminal device in various methods in the implementations of the present disclosure, which will not be described repeatedly herein for brevity.

Figure 11:
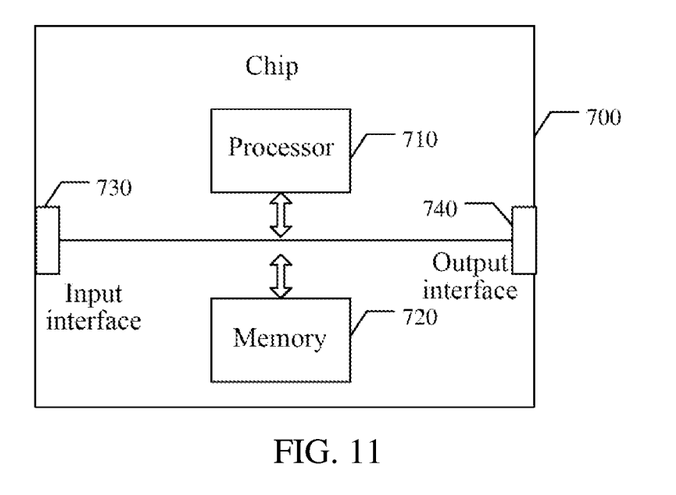
FIG. 11 is a schematic structural diagram of a chip 700 according to an implementation of the present disclosure.

FIG. 11 is a schematic structural diagram of a chip 700 according to an implementation of the present disclosure.

The chip 700 shown in FIG. 11 includes a processor 710, wherein the processor 710 may invoke and run a computer program from a memory to implement the methods in the implementations of the present disclosure.

Optionally, as shown in FIG. 11, the chip 700 may further include the memory 720. The processor 710 may call and run the computer program from the memory 720 to implement the methods in the implementations of the present disclosure.

In the above, the memory 720 may be a separate component independent of the processor 710 or may be integrated in the processor 710.

Optionally, the chip 700 may further include an input interface 730. The processor 710 may control the input interface 730 to communicate with another device or chip. Specifically, the processor 1010 may acquire information or data sent by another device or chip.

Optionally, the chip 700 may further include an output interface 740. The processor 710 may control the output interface 740 to communicate with another device or chip. Specifically, the processor 1010 may output information or data to another device or chip.

Optionally, the chip may be applied to the network device in the implementations of the present disclosure, and the chip may implement the corresponding processes implemented by the network device in various methods in the implementations of the present disclosure, which will not be described repeatedly herein for brevity.

Optionally, the chip may be applied to the mobile terminal/terminal device in the implementations of the present disclosure, and the chip may implement the corresponding processes implemented by the mobile terminal/terminal device in various methods in the implementations of the present disclosure, which will not be described repeatedly herein for brevity.

It should be understood that the chip mentioned in the implementations of the present disclosure may be referred to as a system-level chip, a system chip, a chip system or a system-on-chip, etc.

Figure 12:
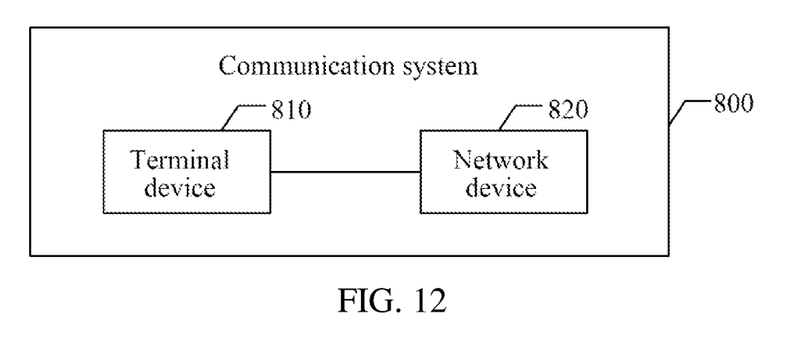
FIG. 12 is a schematic block diagram of a communication system 800 according to an implementation of the present disclosure.

FIG. 12 is a schematic block diagram of a communication system 800 according to an implementation of the present disclosure. As shown in FIG. 12, the communication system 800 may include a terminal device 810 and a network device 820.

The terminal device 810 may be configured to implement the corresponding functions implemented by the terminal device in the above-mentioned methods, and the network device 820 may be configured to implement the corresponding functions implemented by the network device in the above-mentioned methods, which will not be repeated here for brevity.

It should be understood that the processor in the implementations of the present disclosure may be an integrated circuit chip having a signal processing capability. In an implementation process, each of the acts of the foregoing method implementations may be implemented through an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly embodied to be implemented by a hardware decoding processor, or may be implemented by a combination of hardware and software modules in the decoding processor. The software modules may be located in a typical storage medium in the art, such as a random access memory, a flash memory, a read-only memory, a programmable read-only memory, an electrically erasable programmable memory, a register. The storage medium is located in the memory, and the processor reads information in the memory and completes the acts of the foregoing methods in combination with its hardware.

It may be understood that the memory in the implementations of the present disclosure may be a transitory memory or a non-transitory memory, or may include both a transitory memory and a non-transitory memory. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described herein is intended to include, but not be limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program enables the computer to perform the corresponding processes implemented by the network device in various methods in accordance with the implementations of the present disclosure, which will not be described repeatedly for brevity.

Optionally, the computer readable storage medium may be applied to the mobile terminal/terminal device in the implementations of the present disclosure, and the computer program enables the computer to perform the corresponding processes implemented by the mobile terminal/terminal device in various methods in accordance with the implementations of the present disclosure, which will not be described repeatedly for brevity.

An implementation of the present disclosure further provides a computer program product including computer program instructions.

Optionally, the computer program product may be applied to the network device in the implementations of the present disclosure, and the computer program instructions enable the computer to perform the corresponding processes implemented by the network device in various methods in accordance with the implementations of the present disclosure, which will not be described repeatedly for brevity.

Optionally, the computer program product may be applied to the mobile terminal/terminal device in the implementations of the present disclosure, and the computer program instructions cause the computer to perform the corresponding processes implemented by the mobile terminal/terminal device in various methods in accordance with the implementations of the present disclosure, which will not be described repeatedly for brevity.

An implementation of the present disclosure further provides a computer program.

Optionally, the computer program may be applied to the network device in the implementations of the present disclosure. The computer program, when running on a computer, enables the computer to perform the corresponding processes implemented by the network device in various methods in accordance with the implementations of the present disclosure, which will not be described repeatedly for brevity.

Optionally, the computer program may be applied to the mobile terminal/terminal device in the implementations of the present disclosure. The computer program, when running on a computer, enables the computer to perform the corresponding processes implemented by the mobile terminal/terminal device in various methods in accordance with the implementations of the present disclosure, which will not be described repeatedly for brevity.

A person of ordinary skill in the art may recognize that the elements and algorithm acts in various examples described in combination with the implementations disclosed herein can be implemented in electronic hardware, or a combination of computer software and electronic hardware. Whether these functions are implemented in hardware or software depends on specific applications and design constraints of the technical solution. Those skilled in the art may use different methods to implement the described functions for each particular application, but such implementation should not be considered to be beyond the scope of the present disclosure.

Those skilled in the art may clearly understand that for the sake of convenience and conciseness of description, the specific working processes of the systems, apparatuses and units described above may be described with reference to the corresponding processes in the above method implementations and will not be repeated herein.

In several implementations provided by the present disclosure, it should be understood that the disclosed systems, apparatuses and methods may be implemented in another mode. For example, the apparatus implementations described above are only illustrative, for example, the division of the units is only a logical function division, and there may be other division modes in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, apparatuses or units, or may be in electrical, mechanical or other forms.

Units described as separate components may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for enabling a computer device (which may be a personal computer, a server, or a network device, etc.) to perform all or part of the acts of various implementations of the present disclosure. And the aforementioned storage medium includes various media which may store program codes, such as a USB flash disk, a removable hard disk, a ROM, a RAM, a magnetic disk, or an optical disk, etc.

What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for configuring a retransmission resource, comprising:
   acquiring, by a first terminal device, at least two sidelink transmission resources for initial transmission of sidelink data and retransmission of the sidelink data configured by a network device at one time;
   wherein among the at least two sidelink transmission resources, a time interval between any two adjacent sidelink transmission resources is larger than a parameter k, and the parameter k is a time interval between a Physical Sidelink Shared Channel (PSSCH) sent by the first terminal device and a Physical Sidelink Feedback Channel (PSFCH) corresponding to the PSSCH, the parameter k being predetermined by a protocol, configured by the network device, or determined by the first terminal device according to configuration information of the network device,
   wherein the method further comprises:
      performing the retransmission of the sidelink data using an available sidelink transmission resource among the at least two sidelink transmission resources, and
      receiving, by the first terminal device, sidelink feedback information;
      wherein the available sidelink transmission resource among the at least two sidelink transmission resources is a first available sidelink transmission resource located after a time T among the at least two sidelink transmission resources; and
      wherein the time T is a time when the first terminal device receives the sidelink feedback information,
      wherein the first terminal device determines whether to perform the retransmission according to the sidelink feedback information,
      wherein the retransmission is performed by using the available sidelink transmission resource among the at least two sidelink transmission resources.

2. The method according to claim 1,
   wherein the method further comprises: performing, by the first terminal device, the first transmission of the sidelink data by using a first sidelink transmission resource among the at least two sidelink transmission resources.

3. The method according to claim 2,
   wherein the method further comprises: receiving, by the first terminal device, the sidelink feedback information from a second terminal device, and performing the retransmission of the sidelink data if it is determined that the retransmission of the sidelink data is needed according to the sidelink feedback information.

4. The method according to claim 3,
   wherein the available sidelink transmission resource among the at least two sidelink transmission resources comprises:
   a first unused sidelink transmission resource among the at least two sidelink transmission resources.

5. The method according to claim 1, wherein in an event that a negative acknowledgement (NACK) is received, the first terminal device determines to perform the retransmission.

6. The method according to claim 1, wherein in an event that an acknowledgement (ACK) is received, the first terminal device determines not to perform the retransmission.

7. A device for configuring a retransmission resource, wherein the device for configuring the retransmission resource is applied to a first terminal device and comprises a processor, a memory and a transceiver, wherein the memory is configured to store a computer program, the transceiver is configured to communicate with another device under control of the processor, the processor, when executing the computer program, is configured to control the device to,
   acquire at least two sidelink transmission resources for initial transmission of sidelink data and retransmission of the sidelink data configured by a network device at one time;
   wherein among the at least two sidelink transmission resources, a time domain interval between any two adjacent sidelink transmission resources is larger than a parameter k, and the parameter k is a time domain interval between a Physical Sidelink Shared Channel (PSSCH) sent by the first terminal device for configuring the retransmission resource and a Physical Sidelink Feedback Channel (PSFCH) corresponding to the PSSCH, the parameter k being predetermined by a protocol, configured by the network device, or determined by the first terminal device according to configuration information of the network device,
   wherein the method further comprises:
      performing the retransmission of the sidelink data using an available sidelink transmission resource among the at least two sidelink transmission resources, and
      receiving, by the first terminal device, sidelink feedback information;
      wherein the available sidelink transmission resource among the at least two sidelink transmission resources is a first available sidelink transmission resource located after a time T among the at least two sidelink transmission resources; and
      wherein the time T is a time when the first terminal device receives the sidelink feedback information,
      wherein the first terminal device determines whether to perform the retransmission according to the sidelink feedback information,
      wherein the retransmission is performed by using the available sidelink transmission resource among the at least two sidelink transmission resources.

8. The device for configuring the retransmission resource according to claim 7,
   wherein the device for configuring the retransmission resource further comprises a transmitter;
   the transmitter is configured to perform the first transmission of the sidelink data by using a first sidelink transmission resource among the at least two sidelink transmission resources.

9. The device for configuring the retransmission resource according to claim 7, wherein the processor is configured to control the device to, receive, through the transceiver, the sidelink feedback information from a second terminal device, and perform the retransmission of the sidelink data if it is determined that the retransmission of the sidelink data is needed according to the sidelink feedback information.

10. The device for configuring the retransmission resource according to claim 9,
wherein the available sidelink transmission resource among the at least two sidelink transmission resources comprises:
a first unused sidelink transmission resource among the at least two sidelink transmission resources.

11. The device according to claim 7, wherein in an event that a negative acknowledgement (NACK) is received, the first terminal device determines to perform the retransmission.

12. The device according to claim 7, wherein in an event that an acknowledgement (ACK) is received, the first terminal device determines not to perform the retransmission.

13. A device for configuring a retransmission resource, wherein the device for configuring the retransmission resource is applied to a network device and comprises a processor, a memory and a transceiver, wherein the memory is configured to store a computer program, the transceiver is configured to communicate with another device under control of the processor, the processor, when executing the computer program, is configured to control the device to,
configure at least two sidelink transmission resources for a first terminal device for initial transmission of sidelink data and retransmission of the sidelink data at one time;
wherein among the at least two sidelink transmission resources, a time domain interval between any two adjacent sidelink transmission resources is larger than a parameter k, and the parameter k is a time domain interval between a Physical Sidelink Shared Channel (PSSCH) sent by the first terminal device and a Physical Sidelink Feedback Channel (PSFCH) corresponding to the PSSCH, the parameter k being predetermined by a protocol, configured by the network device, or determined by the first terminal device according to configuration information of the network device,
wherein the method further comprises:
performing the retransmission of the sidelink data using an available sidelink transmission resource among the at least two sidelink transmission resources, and
receiving, by the first terminal device, sidelink feedback information;
wherein the available sidelink transmission resource among the at least two sidelink transmission resources is a first available sidelink transmission resource located after a time T among the at least two sidelink transmission resources; and
wherein the time T is a time when the first terminal device receives the sidelink feedback information,
wherein the first terminal device determines whether to perform the retransmission according to the sidelink feedback information,
wherein the retransmission is performed by using the available sidelink transmission resource among the at least two sidelink transmission resources.

14. The device according to claim 13, wherein the available sidelink transmission resource among the at least two sidelink transmission resources comprises:
a first unused sidelink transmission resource among the at least two sidelink transmission resources.

15. The device according to claim 13, wherein in an event that a negative acknowledgement (NACK) is received, the first terminal device determines to perform the retransmission.

16. The device according to claim 13, wherein in an event that an acknowledgement (ACK) is received, the first terminal device determines not to perform the retransmission.

* * * * *